US008611642B2

(12) United States Patent
Wang

(10) Patent No.: US 8,611,642 B2
(45) Date of Patent: Dec. 17, 2013

(54) FORMING A STEROSCOPIC IMAGE USING RANGE MAP

(75) Inventor: Sen Wang, Rochester, NY (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 13/298,334

(22) Filed: Nov. 17, 2011

(65) Prior Publication Data
US 2013/0129193 A1 May 23, 2013

(51) Int. Cl.
G06K 9/00 (2006.01)
(52) U.S. Cl.
USPC .......................................... 382/154
(58) Field of Classification Search
None
See application file for complete search history.

(56) References Cited

U.S. PATENT DOCUMENTS

| 6,075,605 | A | 6/2000 | Futamura | |
| 6,282,362 | B1 | 8/2001 | Murphy | |
| 7,447,558 | B2 | 11/2008 | Pratt | |
| 7,551,760 | B2 | 6/2009 | Scharlack | |
| 7,801,708 | B2 | 9/2010 | Unal | |
| 8,121,352 | B2 | 2/2012 | Arias-Estrada | |
| 2002/0061131 | A1 | 5/2002 | Sawhney | |
| 2004/0105580 | A1* | 6/2004 | Hager et al. | 382/154 |
| 2004/0208358 | A1* | 10/2004 | Tooyama et al. | 382/154 |
| 2005/0036673 | A1* | 2/2005 | Ohba et al. | 382/154 |
| 2007/0035530 | A1* | 2/2007 | Van Geest et al. | 345/204 |
| 2007/0051890 | A1* | 3/2007 | Pittman | 250/332 |
| 2007/0110298 | A1* | 5/2007 | Graepel et al. | 382/154 |
| 2008/0055591 | A1* | 3/2008 | Walton | 356/237.1 |
| 2008/0140638 | A1 | 6/2008 | Bruno | |
| 2008/0175491 | A1 | 7/2008 | Kondo | |
| 2008/0192115 | A1 | 8/2008 | Gindele | |
| 2009/0231425 | A1* | 9/2009 | Zalewski | 348/142 |
| 2009/0232355 | A1 | 9/2009 | Minear | |
| 2010/0104184 | A1 | 4/2010 | Bronstein | |
| 2010/0121577 | A1 | 5/2010 | Zhang | |
| 2010/0157021 | A1 | 6/2010 | Abraham | |
| 2010/0194855 | A1 | 8/2010 | Mamiya | |
| 2010/0195716 | A1* | 8/2010 | Klein Gunnewiek et al. | 375/240.08 |
| 2010/0315505 | A1* | 12/2010 | Michalke et al. | 348/118 |
| 2010/0328308 | A1 | 12/2010 | Gamliel | |

(Continued)

OTHER PUBLICATIONS

Cao et al., "Semi-automatic 2-D-to-3-D conversion using disparity propagation," IEEE Trans. on Broadcasting, vol. 57, pp. 491-499 (2011).

(Continued)

Primary Examiner — Stephen R Koziol
Assistant Examiner — Delomia Gilliard
(74) Attorney, Agent, or Firm — Wong, Cabello, Lutsch, Rutherford & Brucculeri, LLP

(57) ABSTRACT

A method for forming a stereoscopic image from a main image of a scene captured from a main image viewpoint including one or more foreground objects, together a main image range map and a background image. A first-eye image is determined corresponding to a first-eye viewpoint and a second-eye image is determined corresponding to a second-eye viewpoint. At least one of the first-eye image and the second-eye image is determined by warping the main image to the associated viewpoint, wherein the warped main image includes one or more holes corresponding to scene content that was occluded in the main image; warping the background image to the associated viewpoint; and determining pixel values to fill the one or more holes in the warped main image using pixel values at corresponding pixel locations in the warped background image; and forming a stereoscopic image including the first-eye image and the second-eye image.

20 Claims, 8 Drawing Sheets

(56) References Cited

U.S. PATENT DOCUMENTS

| | | | |
|---|---|---|---|
| 2011/0025827 A1* | 2/2011 | Shpunt et al. | 348/47 |
| 2011/0025853 A1 | 2/2011 | Richardson | |
| 2011/0026764 A1 | 2/2011 | Wang | |
| 2011/0080471 A1 | 4/2011 | Song | |
| 2011/0085734 A1 | 4/2011 | Berg | |
| 2011/0090305 A1* | 4/2011 | Ikeda et al. | 348/42 |
| 2011/0096832 A1 | 4/2011 | Zhang | |
| 2011/0115880 A1* | 5/2011 | Yoo et al. | 348/42 |
| 2011/0187832 A1* | 8/2011 | Yoshida | 348/46 |
| 2012/0176380 A1 | 7/2012 | Wang | |

OTHER PUBLICATIONS

Chen et al., "View interpolation for image synthesis," Proc. SIGGRAPH '93, pp. 279-288 (1993).

Dalit Caspi, Nahum Kiryati, and Joseph Shamir, "Range Imaging with Adaptive Color Structured Light," IEEE Transactions on Pattern Analysis and Machine Intelligence, vol. 20, No. 5, May 1998.

Dellaert et al., "Structure from Motion without Correspondence," IEEE Computer Society Conference on Computer Vision and Pattern Recognition (2000).

Eun-Hee Kim, Joonku Hahn, Hwi Kim, and Byoungho Lee, "Profilometry without phase unwrapping using multi-frequency and four-step phase-shift sinusoidal fringe projection," 2009 Optical Society of America.

Fehn, "Depth-image-based rendering (DIBR), compression, and transmission for a new approach on 3D-TV," Proc. SPIE, vol. 5291, pp. 93-104 (2004).

Fitzgibbon et al., "Image-based rendering using image-based priors," International Journal of Computer Vision, vol. 63, pp. 141-151 (2005).

Fleet et al., "Optical Flow Estimation," chapter 15 in Handbook of Mathematical Models in Computer Vision, Eds., Paragios et al. Springer (2006).

Frankowski, G. and Hainich, R., "DLP-Based 3D Metrology by Structured Light or Projected Fringe Technology for Life Sciences and Industrial Metrology," Proc. SPIE Photonics West 2009.

Frankowski et al., "Real-time 3D shape measurement with digital stripe projection by Texas Instruments micromirror devices (DMD)," Proc. SPIE, vol. 3958, pp. 90-106 (2000).

Gael, "Depth maps estimation and use for 3DTV," Technical Report 0379, INRIA Rennes Bretagne Atlantique (2010).

Georg Wiora, "High Resolution Measurement of Phase-Shift Amplitude and numeric Object Phase Calculation," Proceedings of SPIE vol. 4117 (2000).

Giovanna Sansoni, Sara Lazzari, Stefan Peli and Franco Docchio, "3D Imager for Dimensional Gauging of Industrial Workpieces: State of the Art of the Development of a Robust and Versatile System," 1997 IEEE.

Gokturk et al., "A time-of-flight depth sensor-system description, issues, and solutions," Proc. Computer Vision and Pattern Recognition Workshop (2004).

Gortler et al., "The lumigraph," Proc. SIGGRAPH '96, pp. 43-54 (1996).

Guhring, "Dense 3-D surface acquisition by structured light using off-the-shelf components," Videometrics and Optical Methods for 3D Shape Measurement, vol. 4309, pp. 220-231 (2001).

Gunnewiek, R. Klein et al., "Coherent Spatial and Temporal Occlusion Generation," Proceedings of SPIE, vol. 7237, Feb. 5, 2009, 10 pages.

Guttmann et al., "Semi-automatic stereo extraction from video footage," Proc. IEEE 12th International Conference on Computer Vision, pp. 136-142 (2009).

Harman, "Home-based 3-D entertainment-an overview," Proc. International Conference on Image Processing, vol. 1, pp. 1-4 (2000).

Horn et al., "Toward optimal structured light patterns," Image and Vision Computing, vol. 17, pp. 87-97 (1999).

Huang et al., "Fast three-step phase-shifting algorithm," Applied Optics, vol. 45, No. 21, pp. 5086-5091 (2006).

International Search Report received in corresponding PCT Application No. PCT/US2012/064920, mailed Jan. 25, 2013.

Johari et al., "Developing 3D viewing model from 2D stereo pair with its occlusion ratio," International Journal of Image Processing, vol. 4, pp. 251-262 (2010).

Knorr et al., "Super-resolution stereo- and multi-view synthesis from monocular video sequences," Proc. Sixth International Conference on 3-D Digital Imaging and Modeling, pp. 55-64 (2007).

Lee, Cheon et al., "View Synthesis Tools for 3D Video," MPEG Meeting, No. M15851, Oct. 9, 2008, 14 pages.

Levoy et al., "Light field rendering," Proc. SIGGRAPH '96, pp. 31-42 (1996).

Lowe, "Object recognition from local scale-invariant features," Proc. International Conference on Computer Vision, vol. 2, pp. 1150-1157 (1999).

Nikolaus Karpinsky and Song Zhang, "High-resolution, real-time 3D imaging with fringe analysis," Springer-Verlag 2010, Jul. 5, 2010.

Pages et al., "Overview of coded light projection techniques for automatic 3D profiling," IEEE Conf. on Robotics and Automation, pp. 133-138 (2003).

Park et al., "Data-driven mean-shift belief propagation for non-Gaussian MRFs," Proc. IEEE Conference on Computer Vision and Pattern Recognition, pp. 3547-3554 (2010).

Peng et al., "Model and algorithms for point cloud construction using digital projection patterns," ASME Journal of Computing and Information Science in Engineering, vol. 7, pp. 372-381 (2007).

Peng T., Gupta SK., Lau K., "Algorithms for constructing 3-D point clouds using multiple digital fringe projection patterns," Computer-Aided Design and Applications, vol. 2, p. 737-746, Date Published 2005.

Pollefeys et al., "Visual modeling with a handheld camera," International Journal of Computer Vision, vol. 59, pp. 207-232 (2004).

Posdamer et al., "Surface measurement by space-encoded projected beam systems," Computer Graphics and Image Processing, vol. 18, pp. 1-17 (1982).

Pratibha Gupta, "Gray Code Composite Pattern Structured Light Illumination," University of Kentucky Master's Theses, 2007.

Rosario Anchini, Consolatina Liguori, Vincenzo Paciello, and Alfredo Paolillo, "A Comparison Between Stereo-Vision Techniques for the Reconstruction of 3-D Coordinates of Objects," IEEE Transactions on Instrumentation and Measurement, vol. 55, No. 5, Oct. 2006.

Shade et al., "Layered depth images," Proc. SIGGRAPH '98, pp. 231-242 (1998).

Snavely et al., "Photo tourism: Exploring photo collections in 3-D," ACM Transactions on Graphics, vol. 25, pp. 835-846 (2006).

Song Zhang, "High-resolution, Real-time 3-D Shape Measurement," Doctor of Philosophy in Mechanical Engineering, Stony Brook University, May 2005.

Tomasi et al., "Shape and motion from image streams under orthography: a factorization method," Int. J. of Computer Vision, vol. 9, pp. 137-154 (1992).

Yongchang Wang, "Novel Approaches in Structured Light Illumination," University of Kentucky Doctoral Dissertations, 2010.

Yuanzheng Gong and Song Zhang, "Ultrafast 3-D shape measurement with an off-the-shelf DLP projector," OSA, Sep. 13, 2010 / vol. 18, No. 19.

Zhang et al., "3D-TV content creation: automatic 3-D-to-3-D video conversion," IEEE Trans. on Broadcasting, vol. 57, pp. 974-988 (2009).

Zhang et al., "Stereoscopic video synthesis from a monocular video," IEEE Trans. Visualization and Computer Graphics, vol. 13, pp. 686-696 (2007).

Zhang et al., Consistent depth maps recovery from a video sequence, IEEE Trans. Pattern Analysis and Machine Intelligence, vol. 31, pp. 974-988 (2009).

Zitnick et al., "High-quality video view interpolation using a layered representation," ACM Transactions on Graphics, vol. 23, pp. 600-608 (2004).

Zitnick et al., Stereo for image-based rendering using image over-segmentation, International Journal of Computer Vision, vol. 75, pp. 49-65 (2006).

* cited by examiner

FORMING A STEROSCOPIC IMAGE USING RANGE MAP

CROSS-REFERENCE TO RELATED APPLICATIONS

Reference is made to commonly-assigned, co-pending U.S. patent application Ser. No. 13/004,207, entitled "Forming 3D models using periodic illumination patterns" to Kane et al.; commonly assigned, co-pending U.S. patent application Ser. No. 13/298,328, entitled: "Range map determination for a video frame" by Wang et al.; to commonly assigned, co-pending U.S. patent application Ser. No. 13/298,332, entitled: "Modifying the viewpoint of a digital image", by Wang et al.; and to commonly assigned, co-pending U.S. patent application Ser. No. 13/298,337, entitled: "Method for stabilizing a digital video" by Wang et al., each of which is incorporated herein by reference.

FIELD OF THE INVENTION

This invention pertains to the field of digital imaging and more particularly to a method for forming a stereoscopic image.

BACKGROUND OF THE INVENTION

Stereoscopic videos are regarded as the next prevalent media for movies, TV programs, and video games. Three-dimensional (3-D) movies, such as Avatar, Toy Story, Shrek and Thor have achieved great successes in providing extremely vivid visual experiences. The fast developments of stereoscopic display technologies and popularization of 3-D television has inspired people's desires to record their own 3-D videos and display them at home. However, professional stereoscopic recording cameras are very rare and expensive. Meanwhile, there is a great demand to perform 3-D conversion on legacy two-dimensional (2-D) videos. Unfortunately, specialized and complicated interactive 3-D conversion processes currently required, which has prevented the general public from converting captured 2-D videos to 3-D videos. Thus, it is a significant goal to develop an approach to automatically synthesize stereoscopic video from a casual monocular video.

Much research has been devoted to 2-D to 3-D conversion techniques for the purposes of generating stereoscopic videos, and significant progress has been made in this area. Fundamentally, the process of generating stereoscopic videos involves synthesizing the synchronized left and right stereo view sequences based on an original monocular view sequence. Although it is an ill-posed problem, a number of approaches have been designed to address it. Such approaches generally involve the use of human-interaction or other priors. According to the level of human assistance, these approaches can be categorized as manual, semiautomatic or automatic techniques. Manual and semiautomatic methods typically involve an enormous level of human annotation work. Automatic methods utilize extracted 3-D geometry information to synthesis new views for virtual left-eye and right-eye images.

Manual approaches typically involve manually assigning different disparity values to pixels of different objects, and then shifting these pixels horizontally by their disparities to produce a sense of parallax. Any holes generated by this shifting operation are filled manually with appropriate pixels. An example of such an approach is described by Harman in the article "Home-based 3-D entertainment—an overview" (Proc. International Conference on Image Processing, Vol., 1, pp. 1-4, 2000). These methods generally require extensive and time-consuming human interaction.

Semi-automatic approaches only require the users to manually label a sparse set of 3-D information (e.g., with user marked scribbles or strokes) for some a subset of the video frames for a given shot (e.g., the first and last video frames, or key-video frames) to obtain the dense disparity or depth map. Examples of such techniques are described by Guttmann et al. in the article "Semi-automatic stereo extraction from video footage" (Proc. IEEE 12th International Conference on Computer Vision, pp. 136-142, 2009) and by Cao et al. in the article "Semi-automatic 2-D-to-3-D conversion using disparity propagation" (IEEE Trans. on Broadcasting, Vol. 57, pp. 491-499, 2011). The 3-D information for other video frames is propagated from the manually labeled frames. However, the results may degrade significantly if the video frames in one shot are not very similar. Moreover, these methods can only apply to the simple scenes, which only have a few depth layers, such as foreground and background layers. Otherwise, extensive human annotations are still required to discriminate each depth layer.

Automatic approaches can be classified into two categories: non-geometric and geometric methods. Non-geometric methods directly render new virtual views from one nearby video frame in the monocular video sequence. One method of the type is the time-shifting approach described by Zhang et al. in the article "Stereoscopic video synthesis from a monocular video" (IEEE Trans. Visualization and Computer Graphics, Vol. 13, pp. 686-696, 2007). Such methods generally require the original video to be an over-captured images set. They also are unable to preserve the 3-D geometry information of the scene.

Geometric methods generally consists of two main steps: exploration of underline 3-D geometry information and synthesis new virtual view. For some simple scenes captured under stringent conditions, the full and accurate 3-D geometry information (e.g., a 3-D model) can be recovered as described by Pollefeys et al. in the article "Visual modeling with a handheld camera" (International Journal of Computer Vision, Vol. 59, pp. 207-232, 2004). Then, a new view can be rendered using conventional computer graphics techniques.

In most cases, only some of the 3-D geometry information can be obtained from monocular videos, such as a depth map (see: Zhang et al., "Consistent depth maps recovery from a video sequence," IEEE Trans. Pattern Analysis and Machine Intelligence, Vol. 31, pp. 974-988, 2009) or a sparse 3-D scene structure (see: Zhang et al., "3D-TV content creation: automatic 2-D-to-3-D video conversion," IEEE Trans. on Broadcasting, Vol. 57, pp. 372-383, 2011). Image-based rendering (IBR) techniques are then commonly used to synthesize new views (for example, see the article by Zitnick entitled "Stereo for image-based rendering using image over-segmentation" International Journal of Computer Vision, Vol. 75, pp. 49-65, 2006, and the article by Fehn entitled "Depth-image-based rendering (DIBR), compression, and transmission for a new approach on 3D-TV," Proc. SPIE, Vol. 5291, pp. 93-104, 2004).

With accurate geometry information, methods like light field (see: Levoy et al., "Light field rendering," Proc. SIGGRAPH '96, pp. 31-42, 1996), lumigraph (see: Gortler et al., "The lumigraph," Proc. SIGGRAPH '96, pp. 43-54, 1996), view interpolation (see: Chen et al., "View interpolation for image synthesis," Proc. SIGGRAPH '93, pp. 279-288, 1993) and layered-depth images (see: Shade et al., "Layered depth images," Proc. SIGGRAPH '98, pp. 231-242, 1998) can be used to synthesize reasonable new views by sampling and smoothing the scene. However, most IBR methods either synthesize a new view from only one original frame using little geometry information, or require accurate geometry information to fuse multiple frames.

Existing Automatic approaches unavoidably confront two key challenges. First, geometry information estimated from monocular videos are not very accurate, which can't meet the requirement for current image-based rendering (IBR) methods. Examples of IBR methods are described by Zitnick et al. in the aforementioned article "Stereo for image-based rendering using image over-segmentation," and by Fehn in the aforementioned article "Depth-image-based rendering (DIBR), compression, and transmission for a new approach on 3D-TV." Such methods synthesize new virtual views by fetching the exact corresponding pixels in other existing frames. Thus, they can only synthesize good virtual view images based on accurate pixel correspondence map between the virtual views and original frames, which needs precise 3-D geometry information (e.g., dense depth map, and accurate camera parameters). While the required 3-D geometry information can be calculated from multiple synchronized and calibrated cameras as described by Zitnick et al. in the article "High-quality video view interpolation using a layered representation" (ACM Transactions on Graphics, Vol. 23, pp. 600-608, 2004), the determination of such information from a normal monocular video is still quite error-prone.

Furthermore, the image quality that results from the synthesis of virtual views is typically degraded due to occlusion/disocclusion problems. Because of the parallax characteristics associated with different views, holes will be generated at the boundaries of occlusion/disocclusion objects when one view is warped to another view in 3-D. Lacking accurate 3-D geometry information, hole filling approaches are not able to blend information from multiple original frames. As a result, they ignore the underlying connections between frames, and generally perform smoothing-like methods to fill holes. Examples of such methods include view interpolation (See the aforementioned article by Chen et al. entitled "View interpolation for image synthesis"), extrapolation techniques (see: the aforementioned article by Cao et al. entitled "Semi-automatic 2-D-to-3-D conversion using disparity propagation") and median filter techniques (see: Knorr et al., "Super-resolution stereo- and multi-view synthesis from monocular video sequences," Proc. Sixth International Conference on 3-D Digital Imaging and Modeling, pp. 55-64, 2007). Theoretically, these methods cannot obtain the exact information for the missing pixels from other frames, and thus it is difficult to fill the holes correctly. In practice, the boundaries of occlusion/disocclusion objects will be blurred greatly, which will thus degrade the visual experience.

SUMMARY OF THE INVENTION

The present invention represents a method for forming a stereoscopic image, the method implemented at least in part by a data processing system and comprising:
receiving a main image of a scene including one or more foreground objects captured from a main image viewpoint together with a corresponding main image range map, wherein the main image includes a two-dimensional array of image pixels;
receiving a background image of the scene without the one or more foreground objects captured from a background image viewpoint;
specifying a first-eye viewpoint and a second-eye viewpoint;
determining a first-eye image corresponding to the first-eye viewpoint and a second-eye image corresponding to the second-eye viewpoint, wherein at least one of the first-eye image and the second-eye image is determined by:
synthesizing a warped main image by warping the main image to the corresponding first-eye viewpoint or second-eye viewpoint responsive to the main image range map and the main image viewpoint, wherein the warped main image includes one or more holes corresponding to scene content that was occluded in the main image;
synthesizing a warped background image by warping the background image to the corresponding first-eye viewpoint or second-eye viewpoint responsive to the background image viewpoint; and
determining pixel values to fill the one or more holes in the warped main image using pixel values at corresponding pixel locations in the warped background image;
forming a stereoscopic image including the first-eye image and the second-eye image; and
storing the stereoscopic image is a processor-accessible memory.

This invention has the advantage that a stereoscopic image can be formed from a monoscopic main image and a background image, each having associated range maps.

It has the additional advantage that holes in the warped main image can be filled using corresponding pixels in the warped background image.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
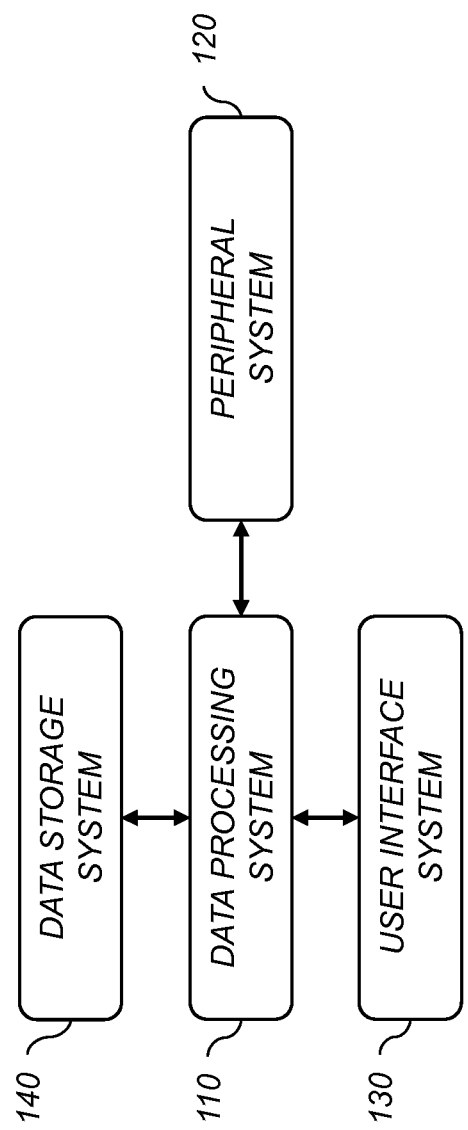
FIG. 1 is a high-level diagram showing the components of a system for processing digital images according to an embodiment of the present invention.

FIG. 1 is a high-level diagram showing the components of a system for processing digital images according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

As discussed in the background of the invention, one of the problems in synthesizing a new view of an image are holes that result from occlusions when an image frame is warped to form the new view. Fortunately, a particular object generally shows up in a series of consecutive video frames in a continuously captured video. As a result, a particular 3-D point in the scene will generally be captured in several consecutive video frames with similar color appearances. To get a high quality synthesized new view, the missing information for the holes can therefore be found in other video frames. The pixel correspondences between adjacent frames can be used to form a color consistency constraint. Thus, various 3-D geometric cures can be integrated to eliminate ambiguity in the pixel correspondences. Accordingly, it is possible to synthesize a new virtual view accurately even using error-prone 3-D geometry information.

In accordance with the present invention a method is described to automatically generate stereoscopic videos from casual monocular videos. In one embodiment three main processes are used. First, a Structure from Motion algorithm such as that described Snavely et al. in the article entitled "Photo tourism: Exploring photo collections in 3-D" (ACM Transactions on Graphics, Vol. 25, pp. 835-846, 2006) is employed to estimate the camera parameters for each frame and the sparse point clouds of the scene. Next, an efficient dense disparity/depth map recovery approach is implemented which leverages aspects of the fast mean-shift belief propagation proposed by Park et al., in the article "Data-driven mean-shift belief propagation for non-Gaussian MRFs" (Proc. IEEE Conference on Computer Vision and Pattern Recognition, pp. 3547-3554, 2010). Finally, new virtual views synthesis is used to form left-eye/right-eye video frame sequences. Since previous works require either accurate 3-D geometry information to perform image-based rendering, or simply interpolate or copy from neighborhood pixels, satisfactory new view images have been difficult to generate. The present method uses a color consistency prior based on the assumption that 3-D points in the scene will show up in several consecutive video frames with similar color texture. Additionally, another prior is used based on the assumption that the synthesized images should be as smooth as a natural image. These priors can be used to eliminate ambiguous geometry information, and improve the quality of synthesized image. A Bayesian-based view synthesis algorithm is described that incorporates estimated camera parameters and dense depth maps of several consecutive frames to synthesize a nearby virtual view image.

Figure 2:
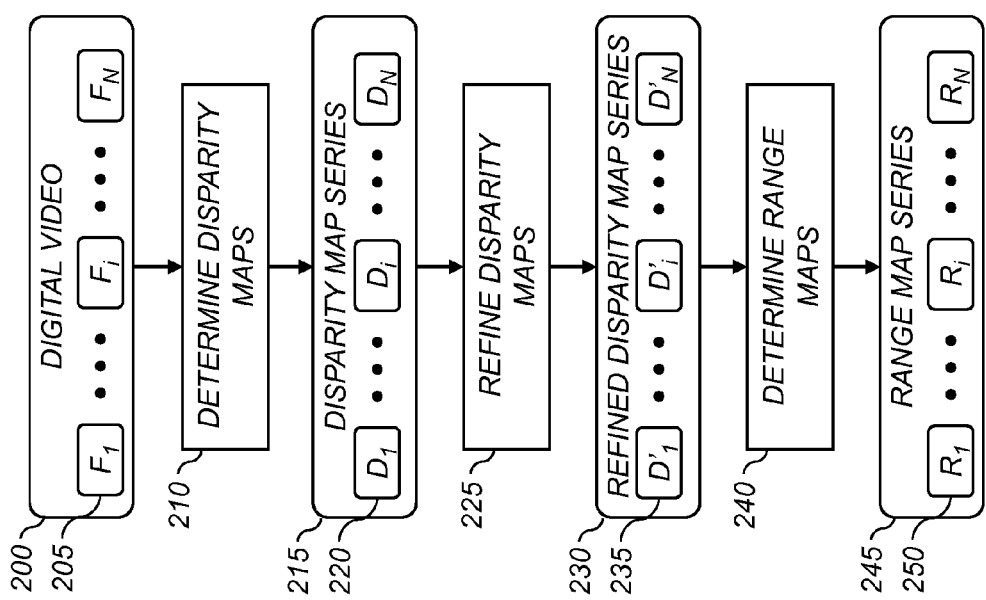
FIG. 2 is a flow chart illustrating a method for determining range maps for frames of a digital video.

Aspects of the present invention will now be described with reference to FIG. 2 which shows a flow chart illustrating a method for determining range maps 250 for video frames 205 ($F_1$-$F_N$) of a digital video 200. The range maps 250 are useful for a variety of different applications including performing various image analysis and image understanding processes, forming warped video frames corresponding to different viewpoints, forming stabilized digital videos and forming stereoscopic videos from monoscopic videos. Table 1 defines notation that will be used in the description of the present invention.

TABLE 1

Notation

| | |
|---|---|
| $F_i$ | Input video frame sequence, i = 1 to N |
| $C_i$ | Estimated camera parameters for $F_i$ (includes both intrinsic and extrinsic camera parameters) |
| $R_i$ | Range map for $F_i$ |
| $V_T$ | target viewpoint |
| $SF_v$ | Synthesized frame for target viewpoint $V_T$ |
| (x; y) | Subscript, which indicates the pixel location in an image or a depth map (e.g., $F_{i,(x,y)}$ refers the pixel at coordinate (x, y) in frame $F_i$, and $R_{i,(x,y)}$ is the corresponding depth value) |
| fC(W, F) | shows the pixel correspondences from a warped frame W to the original frame F. (e.g., fC($SF_v$, $F_i$) shows the correspondence map from $SF_v$ to $F_i$, and fC($SF_{v,(x,y)}$, $F_i$) indicates the corresponding pixel in $F_i$ for $SF_{v,(x,y)}$) |

A determine disparity maps step 210 is used to determine a disparity map series 215 including a disparity map 220 ($D_1$-$D_N$) corresponding to each of the video frames 205. Each disparity map 220 is a 2-D array of disparity values that provide an indication of the disparity between the pixels in the corresponding video frame 205 and a second video frame selected from the digital video 200. In a preferred embodiment, the second video frame is selected from a set of candidate frames according to a set of criteria that includes an image similarity criterion and a position difference criterion. The disparity map series 215 can be determined using any method known in the art. A preferred embodiment of the determine disparity maps step 210 will be described later with respect to FIG. 3.

The disparity maps 220 will commonly contain various artifacts due to inaccuracies introduced by the determine disparity maps step 210. A refine disparity maps step 225 is used to determine a refined disparity map series 230 that includes refined disparity maps 235 ($D'_1$-$D'_N$). In a preferred embodiment, the refine disparity maps step 225 applies two processing stages. A first processing stage using an image segmentation algorithm to provide spatially smooth the disparity values, and a second processing stage applies a temporal smoothing operation.

For the first processing stage of the refine disparity maps step 225, an image segmentation algorithm is used to identify contiguous image regions (i.e., clusters) having image pixels with similar color and disparity. The disparity values are then smoothed within each of the clusters. In a preferred embodiment, the disparities are smoothed by determining a mean disparity value for each of the clusters, and then updating the disparity value assigned to each of the pixels in the cluster to be equal to the mean disparity value. In one embodiment, the clusters are determined using the method described with respect to FIG. 3 in commonly-assigned U.S. Patent Application Publication 2011/0026764 to Wang, entitled "Detection of objects using range information," which is incorporated herein by reference.

For the second processing stage of the refine disparity maps step 225, the disparity values are temporally smoothed across a set of video frames 205 surrounding the particular video frame $F_i$. Using approximately 3 to 5 video frames 205 before and after the particular video frame $F_i$ have been found to produce good results. For each video frame 205, motion vectors are determined that relate the pixel positions in that video frame 205 to the corresponding pixel position in the particular video frame $F_i$. For each of the clusters of image pixels determined in the first processing stage, corresponding cluster positions in the other video frames 205 are determined using the motion vectors. The average of the disparity values determined for the corresponding clusters in the set of video frames are then averaged to determine the refined disparity values for the refined disparity map 235.

Finally, a determine range maps step 240 is used to determine a range map series 245 that includes a range map 250 ($R_1$-$R_N$) that corresponds to each of the video frames 205. The range maps 250 are a 2-D array of range values representing a "range" (e.g., a "depth" from the camera to the scene) for each pixel in the corresponding video frames 205. The range values can be calculated by triangulation from the disparity values in the corresponding disparity map 220 given a knowledge of the camera positions (including a 3-D location and a pointing direction determined from the extrinsic parameters) and the image magnification (determined from the intrinsic parameters) for the two video frames 205 that were used to determine the disparity maps 220. Methods for determining the range values by triangulation are well-known in the art.

The camera positions used to determine the range values can be determined in a variety of ways. As will be discussed in more detail later with respect to FIG. 3, methods for determining the camera positions include the use of position sensors in the digital camera, and the automatic analysis of the video frames 205 to estimate the camera positions based on the motion of image content within the video frames 205.

Figure 3:
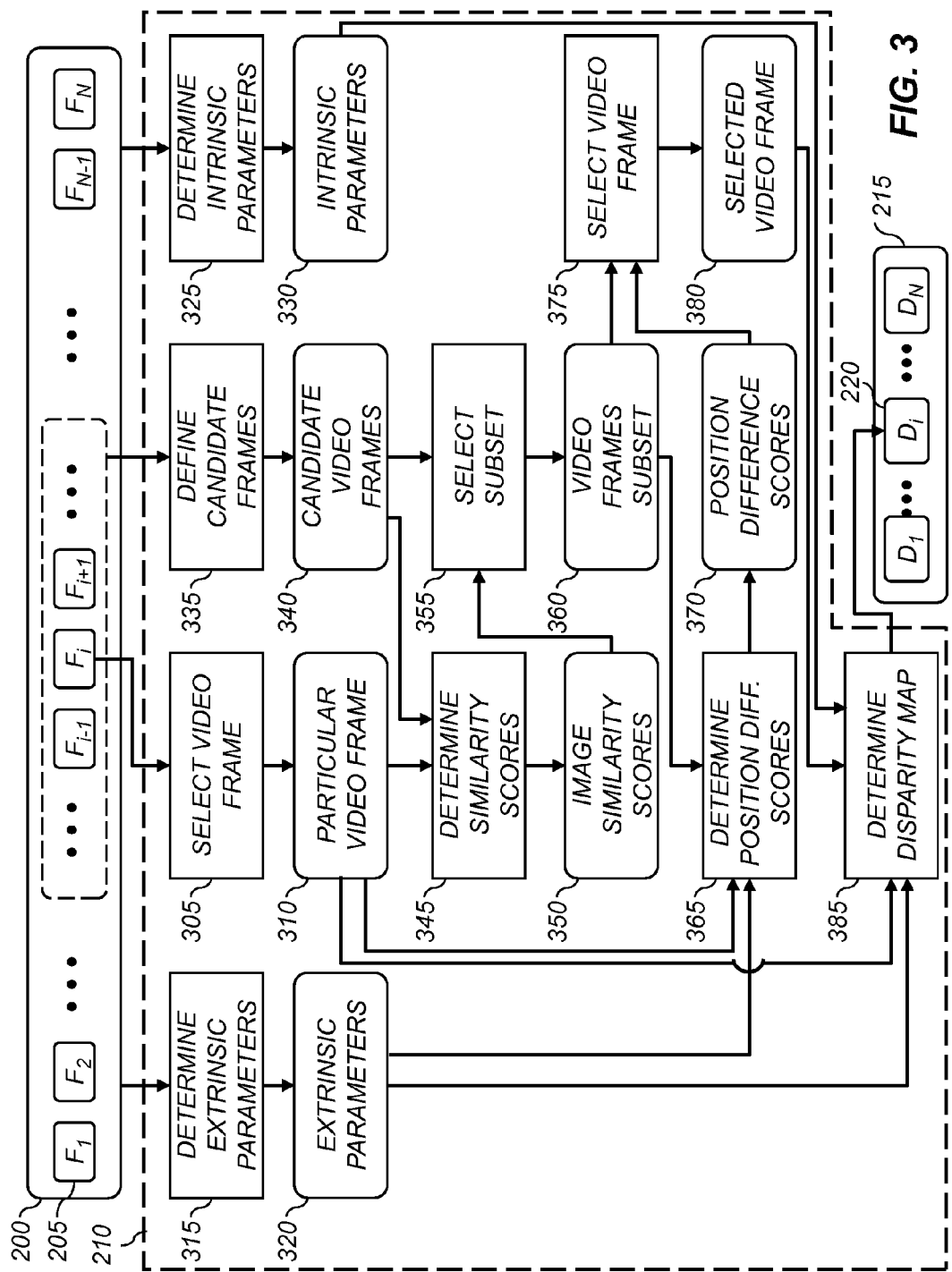
FIG. 3 is a flowchart showing additional details for the determine disparity maps step of FIG. 2.

FIG. 3 shows a flowchart showing additional details of the determine disparity maps step 210 according to a preferred embodiment. The input digital video 200 includes a temporal sequence of video frames 205. In the illustrated example, a disparity map 220 ($D_i$) is determined corresponding to a particular input video frame 205 ($F_i$). This process can be repeated for each of the video frames 205 to determine each of the disparity maps 220 the disparity map series 215.

A select video frame step 305 is used to select a particular video frame 310 (in this example the $i^{th}$ video frame $F_i$). A define candidate video frames step 335 is used to define a set of candidate video frames 340 from which a second video frame will be selected that is appropriate for forming a stereo image pair. The candidate video frames 340 will generally include a set of frames that occur near to the particular video frame 310 in the sequence of video frames 205. For example, the candidate video frames 340 can include all of the neighboring video frames that occur within a predefined interval of the particular video frame (e.g., +/−10 to 20 frames). In some embodiments, only a subset of the neighboring video frames are included in the set of candidate video frames 340 (e.g., every second frame or every tenth frame). This can enable including candidate video frames 340 that span a larger time interval of the digital video 200 without requiring the analysis of an excessive number of candidate video frames 340.

A determine intrinsic parameters step 325 is used to determine intrinsic parameters 330 for each video frame 205. The intrinsic parameters are related to a magnification of the video frames. In some embodiments, the intrinsic parameters are determined responsive to metadata indicating the optical configuration of the digital camera during the image capture process. For example, in some embodiments, the digital camera has a zoom lens and the intrinsic parameters include a lens focal length setting that is recorded during the capturing the of digital video 200. Some digital cameras also include a "digital zoom" capability whereby the captured images are cropped to provide further magnification. This effectively extends the "focal length" range of the digital camera. There are various ways that intrinsic parameters can be defined to represent the magnification. For example, the focal length can be recorded directly. Alternately, a magnification factor relative to reference focal length, or an angular extent can be recorded. In other embodiments, the intrinsic parameters 330 can be determined by analyzing the digital video 200. For example, as will be discussed in more detail later, the intrinsic parameters 330 can be determined using a "structure from motion" (SFM) algorithm.

A determine extrinsic parameters step 315 is used to analyze the digital video 200 to determine a set of extrinsic parameters 320 corresponding to each video frame 205. The extrinsic parameters provide an indication of the camera position of the digital camera that was used to capture the digital video 200. The camera position includes both a 3-D camera location and a pointing direction (i.e., an orientation) of the digital camera. In a preferred embodiment, the extrinsic parameters 320 include a translation vector ($T_i$) which specifies the 3-D camera location relative to a reference location and a rotation matrix ($M_i$) which relates to the pointing direction of the digital camera.

The determine extrinsic parameters step 315 can be performed using any method known in the art. In some embodiments, the digital camera used to capture the digital video 200 may include position sensors (location sensors and orientation sensors) that directly sense the position of the digital camera (either as an absolute camera position or a relative camera position) at the time that the digital video 200 was captured. The sensed camera position information can then be stored as metadata associated with the video frames 205 in the file used to store the digital video 200. Types of position sensors used in digital cameras commonly include gyroscopes, accelerometers and global positioning system (GPS) sensors.

In other embodiments, the camera positions can be estimated by analyzing the digital video 200. In a preferred embodiment, the camera positions can be determined using a so called "structure from motion" (SFM) algorithm (or some other type of "camera calibration" algorithm). SFM algorithms are used in the art to extract 3-D geometry information from a set of 2-D images of an object or a scene. The 2-D images can be consecutive frames taken from a video, or pictures taken with an ordinary camera from different directions. In accordance with the present invention, an SFM algorithm can be used to recover the camera intrinsic parameters 330 and extrinsic parameters 320 for each video frame 205. Such algorithms can also be used to reconstruct 3-D sparse point clouds. The most common SFM algorithms involve key-point detection and matching, forming consistent matching tracks and solving camera parameters.

An example of an SFM algorithm that can be used to determine the intrinsic parameters 330 and the extrinsic parameters 320 in accordance with the present invention is described in the aforementioned article by Snavely et al. entitled "Photo tourism: Exploring photo collections in 3-D." In a preferred embodiment, two modifications to the basic algorithms are made. 1) Since the input are an ordered set of 2-D video frames 205, key-points from only certain neighborhood frames are matched to save computational cost. 2) To guarantee enough baselines and reduce the numerical errors in solving camera parameters, some key-frames are eliminated according to an elimination criterion. The elimination criterion is to guarantee large baselines and a large number of matching points between two consecutive key frames. The camera parameters for these key-frames are used as initial values for a second run using the entire sequence of video frames 205.

A determine similarity scores step 345 is used to determine image similarity scores 350 providing an indication of the similarity between the particular video frame 310 and each of the candidate video frames. In some embodiments, larger image similarity scores 350 correspond to a higher degree of image similarity. In other embodiments, the image similarity scores 350 are representations of image differences. In such cases, smaller image similarity scores 350 correspond to smaller image differences, and therefore to a higher degree of image similarity.

Any method for determining image similarity scores 350 known in the art can be used in accordance with the present invention. In a preferred embodiment, the image similarity score 350 for a pair of video frames is computed by determining SIFT features for the two video frames, and determining the number of matching SIFT features that are common to the two video frames. Matching SIFT features are defined to be those that are similar to within a predefined difference. In some embodiments, the image similarity score 350 is simply set to be equal to the number of matching SIFT features. In other embodiments, the image similarity score 350 can be determined using a function that is responsive to the number of matching SIFT features. The determination of SIFT features are well-known in the image processing art. In a preferred embodiment, the SIFT features are determined and matched using methods described by Lowe in the article entitled "Object recognition from local scale-invariant features" (Proc. International Conference on Computer Vision, Vol. 2, pp. 1150-1157, 1999), which is incorporated herein by reference.

A select subset step 355 is used to determine a subset of the candidate video frames 340 that have a high degree of similarity to the particular video frame, thereby providing a video frames subset 360. In a preferred embodiment, the image similarity scores 350 are compared to a predefined threshold (e.g., 200) to select the video frame subset. In cases where larger image similarity scores 350 correspond to a higher degree of image similarity, those candidate video frames 340 having image similarity scores 350 that exceed the predefined threshold are included in the video frames subset 360. In cases where smaller image similarity scores 350 correspond to a higher degree of image similarity, those candidate video frames 340 having image similarity scores that are less than the predefined threshold are included in the video frames subset 360. In some embodiments, the threshold is determined adaptively based on the distribution of image similarity scores. For example, the threshold can be set so that a predefined number of candidate video frames 340 having the highest degree of image similarity with the particular video frame 310 are included in the video frames subset 360.

Next, a determine position difference scores step 365 is used to determine position difference scores 370 relating to differences between the positions of the digital video camera for the video frames in the video frames subset 360 and the particular video frame 310. In a preferred embodiment, the position difference scores are determined responsive to the extrinsic parameters 320 associated with the corresponding video frames.

The position difference scores 370 can be determined using any method known in the art. In a preferred embodiment, the position difference scores include a location term as well as an angular term. The location term is proportional to a Euclidean distance between the camera locations for the two video frames ($D_L = ((x_2-x_1)^2 + (y_2-y_1)^2 + (z_2-z_1)^2)^{0.5}$, where ($x_1, y_1, z_1$) and ($x_2, y_2, z_2$) are the camera locations for the two frames). The angular term is proportional to the angular change in the camera pointing direction for the two video frames ($D_A = \arccos(P_1 * P_2 / |P_1 * P_2|)$, where $P_1$ and $P_2$ are pointing direction vectors for the two video frames). The location term and the angular term can then be combined using a weighted average to determine the position difference scores 370. In other embodiments, the "3D quality criterion" described by Gaël in the technical report entitled "Depth maps estimation and use for 3DTV" (Technical Report 0379, INRIA Rennes Bretagne Atlantique, 2010) can be used as the position difference scores 370.

A select video frame step 375 is used to select a selected video frame 38 from the video frames subset 360 responsive to the position difference scores 370. It is generally easier to determine disparity values from image pairs having larger camera location differences. In a preferred embodiment, the select video frame step 375 selects the video frame in the video frames subset 360 having the largest position difference. This provides the selected video frame 380 having the largest degree of disparity relative to the particular video frame 310.

A determine disparity map step 385 is used to determine the disparity map 220 ($D_t$) having disparity values for an array of pixel locations by automatically analyzing the particular video frame 310 and the selected video frame 380. The disparity values represent a displacement between the image pixels in the particular video frame 310 and corresponding image pixels in the selected video frame 380.

The determine disparity map step 385 can use any method known in the art for determining a disparity map 220 from a stereo image pair can be used in accordance with the present invention. In a preferred embodiment, the disparity map 220 is determined by using an "optical flow algorithm" to determine corresponding points in the stereo image pair. Optical flow algorithms are well-known in the art. In some embodiments, the optical flow estimation algorithm described by Fleet et al. in the book chapter "Optical Flow Estimation" (chapter 15 in Handbook of Mathematical Models in Computer Vision, Eds., Paragios et al., Springer, 2006) can be used to determine the corresponding points. The disparity values to populate the disparity map 220 are then given by the Euclidean distance between the pixel locations for the corresponding points in the stereo image pair. An interpolation operation can be used to fill any holes in the resulting disparity map 220 (e.g., corresponding to occlusions in the stereo image pair). In some embodiments, a smoothing operation can be used to reduce noise in the estimated disparity values.

While the method for determining the disparity map 220 in the method of FIG. 3 was described with reference to a set of video frames 205 for a digital video 200, one skilled in the art will recognize that it can also be applied to determining a range map for a digital still image of a scene. In this case, the digital still image is used for the particular video frame 310, and a set of complementary digital still images of the same scene captured from different viewpoints are used for the candidate video frames 340. The complementary digital still images can be images captured by the same digital camera (where it is repositioned to change the viewpoint), or can even be captured by different digital cameras.

Figure 4:
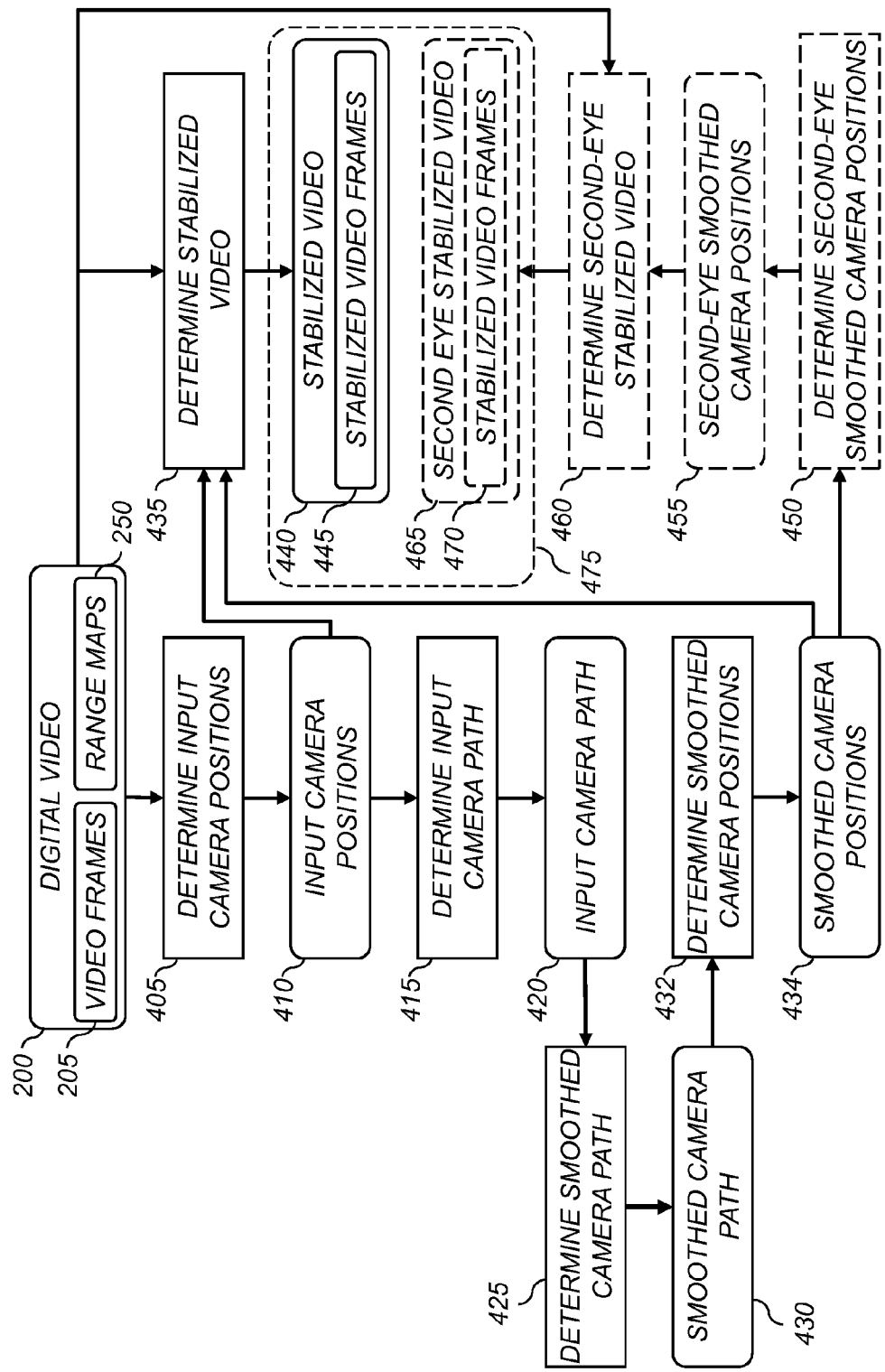
FIG. 4 is a flowchart of a method for determining a stabilized video from an input digital video.

FIG. 4 shows a flowchart of a method for determining a stabilized video 440 from an input digital video 200 that includes a sequence of video frames 205 and corresponding range maps 250. In a preferred embodiment, the range maps 250 are determined using the method that was described above with respect to FIGS. 2 and 3. A determine input camera positions step 405 is used to determine input camera positions 410 for each video frame 205 in the digital video 200. In a preferred embodiment, the input camera positions 410 include both 3-D locations and pointing directions of the digital camera. As was discussed earlier with respect to the determine extrinsic parameters step 315 in FIG. 3, there are a variety of ways that camera positions can be determined. Such methods include directly measuring the camera positions using position sensors in the digital camera, and using an automatic algorithm (e.g., a structure from motion algorithm) to estimate the camera positions by analyzing the video frames 205.

Figure 5:
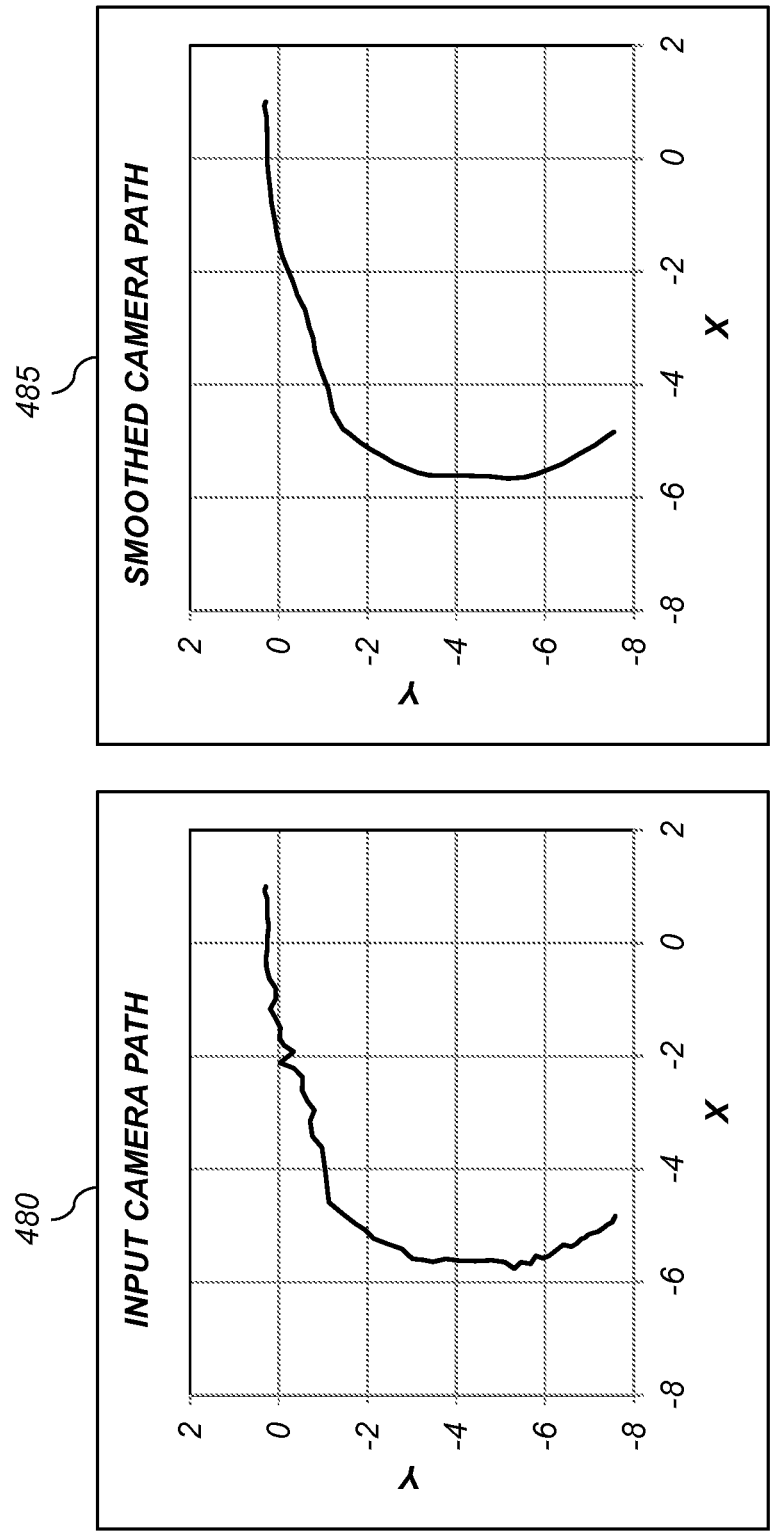
FIG. 5 shows a graph of a smoothed camera path.

A determine input camera path step 415 is used to determine an input camera path 420 for the digital video 200. In a preferred embodiment, the input camera path 420 is a look-up table (LUT) specifying the input camera positions 410 as a function of a video frame index. FIG. 5 shows an example of an input camera path graph 480 showing a plot showing two dimensions of the input camera path 420 (i.e., the x-coordinate and the y-coordinate of the 3-D camera location). Similar plots could be made for the other dimension of the 3-D camera location, as well as the dimensions of the camera pointing direction.

Returning to a discussion of FIG. 4, a determine smoothed camera path step 425 is used to determine a smoothed camera path 430 by applying a smoothing operation to the input camera path 420. Any type of smoothing operation known in the art can be used to determine the smoothed camera path 430. In a preferred embodiment, the smoothed camera path 430 is determined by fitting a smoothing spline (e.g., a cubic spline having a set of knot points) to the input camera path 420. Smoothing splines are well-known in the art. The smoothness of the smoothed camera path 430 can typically be controlled by adjusting the number of knot points in the smoothing spline. In other embodiments, the smoothed camera path 430 can be determined by convolving the LUT for each dimension of the input camera path 420 with a smoothing filter (e.g., a low-pass filter). FIG. 5 shows an example of a smoothed camera path graph 485 that was formed by applying a smoothing spline to the input camera path 420 corresponding to the input camera path graph 480.

In some embodiments random variations can be added to the smoothed camera path 430 so that the stabilized video 440 retains a "hand-held" look. The characteristics (amplitude and temporal frequency content) of the random variations are preferably selected to be typical of high-quality consumer videos.

In some embodiments, a user interface can be provided to enable a user to adjust the smoothed camera path 430. For example, the user can be enabled to specify modifications to the camera location, the camera pointing direction and the magnification as a function of time.

A determine smoothed camera positions step 432 is used to determine smoothed camera positions 434. The smoothed camera positions 434 will be used to synthesize a series of stabilized video frames 445 for a stabilized video 440. In a preferred embodiment, the smoothed camera positions 434 are determined by uniformly sampling the smoothed camera path 430. For the case where the smoothed camera path 430 is represented using a smoothed camera position LUT, the individual LUT entries can each be taken to be smoothed camera positions 434 for corresponding stabilized video frames 445. For the case where the smoothed camera path 430 is represented using a spline representation, the spline function can be sampled to determine the smoothed camera positions 434 for each of the stabilized video frames 445.

A determine stabilized video step 435 is used to determine a sequence of stabilized video frames 445 for the stabilized video 440. The stabilized video frames 445 are determined by modifying the video frames 205 in the input digital video 200 to synthesize new views of the scene having viewpoints corresponding to the smoothed camera positions 434. In a preferred embodiment, each stabilized video frame 445 is determined by modifying the video frame 205 having the input camera position that is nearest to the desired smoothed camera position 434.

Any method for modifying the viewpoint of a digital image known in the art can be used in accordance with the present invention. In a preferred embodiment, the determine stabilized video step 435 synthesizes the stabilized video frames 445 using the method that is described below with respect to FIG. 6.

In some embodiments, an input magnification value for each of the input video frames 205 in addition to the input camera positions 410. The input magnification values are related to the zoom setting of the digital video camera. Smoothed magnification values can then be determined for each stabilized video frame 445. The smoothed magnification values provide smoother transitions in the image magnification. The magnification of each stabilized video frame 445 is then adjusted according to the corresponding smoothed magnification value.

In some applications, it is desirable to form a stereoscopic video from a monocular input video. The above-described method can easily be extended to produce a stabilized stereoscopic video 475 using a series of optional steps (shown with dashed outline). The stabilized stereoscopic video 475 includes two complete videos, one corresponding to each eye of an observer. The stabilized video 440 is displayed to one eye of the observer, while a second-eye stabilized video 465 is displayed to the second eye of the observer. Any method for displaying stereoscopic videos known in the art can be used to display the stabilized stereoscopic video 475. For example, the two videos can be projected onto a screen using light having orthogonal polarizations. The observer can then view the screen using glasses having corresponding polarizing filters for each eye.

To determine the second-eye stabilized video 465, a determine second-eye smoothed camera positions 450 is used to determine second-eye smoothed camera positions 455. In a preferred embodiment, the second-eye smoothed camera positions 455 have the same pointing directions as the corresponding smoothed camera positions 434, and the camera location is shifted laterally relative to the pointing direction by a predefined spatial increment. To form a stabilized stereoscopic video 475 having realistic depth, the predefined spatial increment should correspond to the distance between the left and right eyes of a typical observer (i.e., about 6-7 cm). The amount of depth perception can be increased or decreased by adjusting the size of the spatial increment accordingly.

A determine second-eye stabilized video step 460 is used to form the stabilized video frames 470 by modifying the video frames 205 in the input digital video 200 to synthesize new views of the scene having viewpoints corresponding to the second-eye smoothed camera positions 455. This step uses an identical process to that used by the determine stabilized video step 435.

Figure 6:
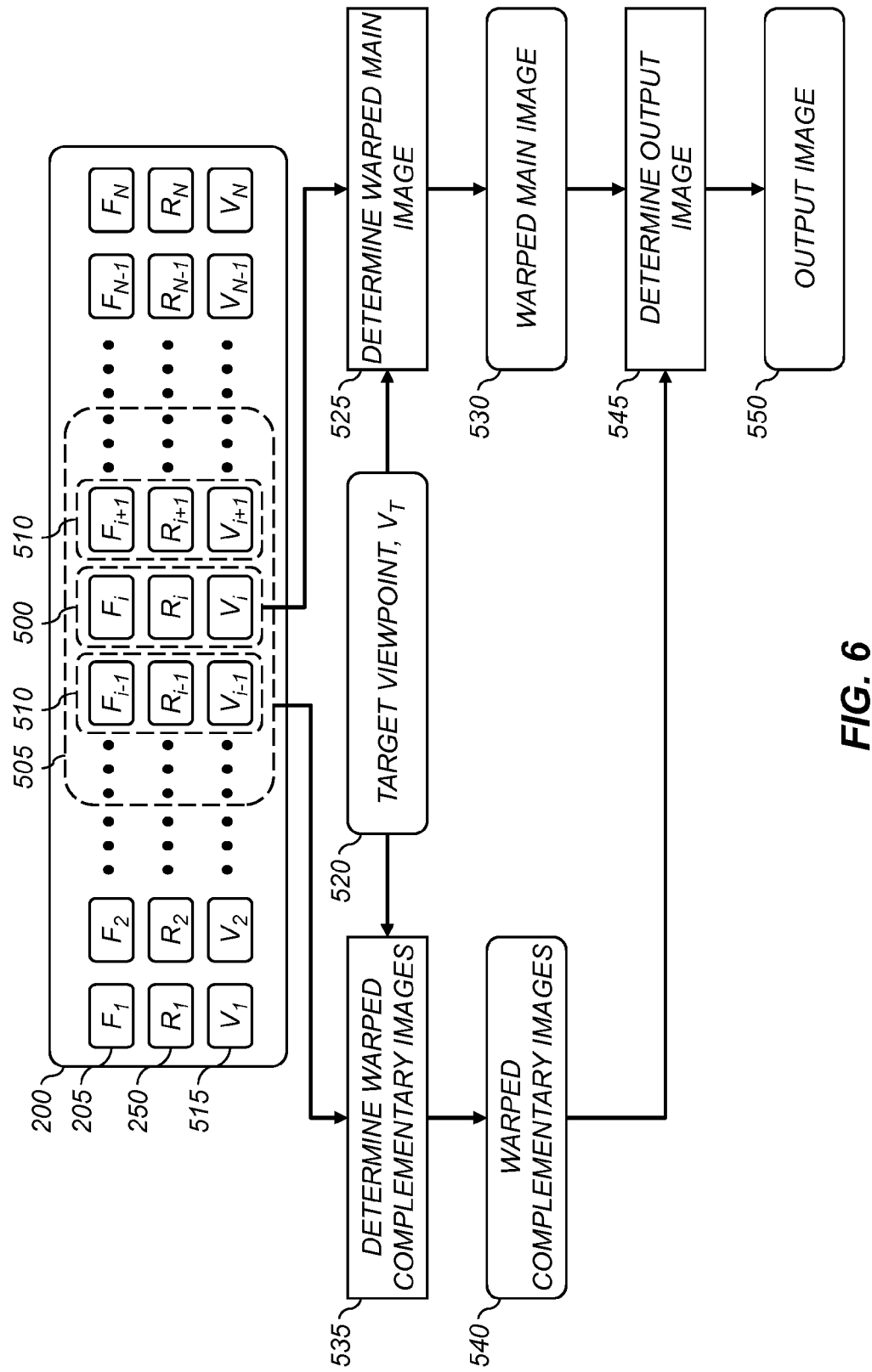
FIG. 6 is a flow chart of a method for modifying the viewpoint of a main image of a scene.

FIG. 6 shows a flow chart of a method for modifying the viewpoint of a main image 500 of a scene captured from a first viewpoint ($V_i$). The method makes use of a set of complementary images 505 of the scene including one or more complementary images 510 captured from viewpoints that are different from the first viewpoint. This method can be used to perform the determine stabilized video step 435 and the determine second-eye stabilized video step 460 discussed earlier with respect to FIG. 4.

In the illustrated embodiment, the main image 500 corresponds to a particular image frame ($F_i$) from a digital video 200 that includes a time sequence of video frames 205 ($F_1$-$F_N$). Each video frame 205 is captured from a corresponding viewpoint 515 ($V_1$-$V_N$) and has an associated range map 250 ($R_1$-$R_N$). The range maps 250 can be determined using any method known in the art. In a preferred embodiment, the range maps 250 are determined using the method described earlier with respect to FIGS. 2 and 3.

The set of complementary images 505 includes one or more complementary image 510 corresponding to image frames that are close to the main image 500 in the sequence of video frames 205. In one embodiment, the complementary images 510 include one or both of the image frames that immediately precede and follow the main image 500. In other embodiments, the complementary images can be the image frames occurring a fixed number frames away from the main image 500 (e.g., 5 frames). In other embodiments, the complementary images 510 can include more than two image frames (e.g., video frames $F_{i-10}$, $F_{i-5}$, $F_{i+5}$ and $F_{i+10}$). In some embodiments, the image frames that are selected to be complementary images 510 are determined based on their viewpoints 515 to ensure that they have a sufficiently different viewpoints from the main image 500.

A target viewpoint 520 ($V_T$) is specified, which is to be used to determine a synthesized output image 550 of the scene. A determine warped main image step 525 is used to determine a warped main image 530 from the main image 500. The warped main image 530 corresponds to an estimate of the image of the scene that would have been captured from the target viewpoint 520. In a preferred embodiment the determine warped main image step 525 uses a pixel-level depth-based projection algorithm; such algorithms are well-known in the art and generally involve using a range map that provides depth information. Frequently, the warped main image 530 will include one or more "holes" corresponding to scene content that was occluded in the main image 500, but would be visible from the target viewpoint.

The determine warped main image step 525 can use any method for warping an input image to simulate a new viewpoint that is known in the art. In a preferred embodiment, the determine warped main image step 525 uses a Bayesian-based view synthesis approach as will be described below.

Similarly, a determine warped complementary images step 535 is used to determine a set of warped complementary images 540 corresponding again to the target viewpoint 520. In a preferred embodiment, the warped complementary images 540 are determined using the same method that was used by the determine warped main image step 525. The warped complementary images 540 will be have the same viewpoint as the warped main image 530, and will be spatially aligned with the warped main image 530. If the complementary images 510 have been chosen appropriately, one or more of the warped complementary images 540 will contain image content in the image regions corresponding to the holes in the warped main image 530. A determine output image step 545 is used to determine an output image 550 by combining the warped main image 530 and the warped complementary images 540. In a preferred embodiment, the determine output image step 545 determines pixel values for each of the image pixels in the one or more holes in the warped main image 530 using pixel values at corresponding pixel locations in the warped complementary images 540.

In some embodiments, the pixel values of the output image 550 are simply copied from the corresponding pixels in the warped main image 530. Any holes in the warped main image 530 can be filled by copying pixel values from corresponding pixels in one of the warped complementary images 540. In other embodiments, the pixel values of the output image 550 are determined by forming a weighted combination of corresponding pixels in the warped main image 530 and the warped complementary images 540. For cases where the warped main image 530 or one or more of the warped complementary images 540 have holes, only pixels values from pixels that are not in (or near) holes should preferably be included in the weighted combination. In some embodiments, only output pixels that are in (or near) holes in the warped main image 530 are determined using the weighted combination. As will be described later, in a preferred embodiment, pixel values for the output image 550 are determined using the Bayesian-based view synthesis approach.

While the method for warping the main image 500 to determine the output image 550 with a modified viewpoint was described with reference to a set of video frames 205 for a digital video 200, one skilled in the art will recognize that it can also be applied to adjust the viewpoint of a main image that is a digital still image captured with a digital still camera. In this case, the complementary images 510 are images of the same scene captured from different viewpoints. The complementary images 510 can be images captured by the same digital still camera (where it is repositioned to change the viewpoint), or can even be captured by different digital still cameras.

A Bayesian-based view synthesis approach that can be used to simultaneously perform the determine warped main image step 525, the determine warped complementary images step 535, and the determine output image step 545 according to a preferred embodiment will now be described. Given a sequence of video frames 205 $F_i(i=1-N)$, together with corresponding range information $R_i$ and camera parameters $C_i$ that specify the camera viewpoints $V_i$, the goal is to synthesize the output image 550 ($SF_v$) at the specified target viewpoint 520 ($V_T$). The camera parameters for frame i can be denoted as $C_i = \{K_i, M_i, T_i\}$, where $K_i$ is a matrix including intrinsic camera parameters (e.g., parameters related to the lens magnification), and $M_i$ and $T_i$ are extrinsic camera parameters specifying a camera position. In particular, $M_i$ is a rotation matrix and $T_i$ is a translation vector, which specify a change in camera pointing direction and camera location, respectively, relative to a reference camera position. Taken together, $M_i$ and $T_i$ define the viewpoint $V_i$ for the video frame $F_i$. The range map $R_i$ provides information about a third dimension for video frame $F_i$, indicating the "z" coordinate (i.e., "range" or "depth") for each (x,y) pixel location and thereby providing 3-D coordinates relative to the camera coordinate system.

It can be shown that the pixels in one image frame (with known camera parameters and range map) can be mapped to corresponding pixel positions in another virtual view using the following geometric relationship:

$$p_v = R_i(p_i) K_v M_v^T M_i K_i^{-1} p_i + K_v M_v^T (T_i - T_v) \quad (1)$$

where $K_i$, $M_i$ and $T_i$ are the intrinsic camera parameters, rotation matrix, and translation vector, respectively, specifying the camera position for an input image frame $F_i$, $K_v$, $M_v$ and $T_v$ are the intrinsic camera parameters, rotation matrix, and translation vector, respectively, specifying a camera position for a new virtual view, $p_i$ is the 2-D point in the input image frame, $R_i(p_i)$ is the range value for the 2-D point $p_i$, and $p_v$ is the corresponding 2-D point in an image plane with the specified new virtual view. The superscript "T" indicates a matrix transpose operation, and the superscript "−1" indicates a matrix inversion operation.

A pixel correspondence function $fC_i = fC(W_i, F_i)$ can be defined using the transformation given Eq. (1) to relate the 2-D pixel coordinates in the $i^{th}$ video frame $F_i$ to the corresponding 2-D pixel coordinates in the corresponding warped image $W_i$ with the target viewpoint 520.

The goal is to synthesis the most likely rendered virtual view $SF_v$ to be used for output image 550. We formulate the problem as a probability problem in Bayesian framework, and wish to generate the virtual view $SF_v$ which can maximize the joint probability:

$$p(SF_v | V_T, \{F_i\}, \{C_i\}, \{R_i\}, i \in \Phi \quad (2)$$

where $F_i$ is the $i^{th}$ video frame of the digital video 200, $C_i$ and $R_i$ are corresponding camera parameters and range maps, respectively, $V_T$ is the target viewpoint 520, and $\Phi$ is the set of image frame indices that include the main image 500 and the complementary images 510.

To decompose the joint probability function in Eq. (2), the statistical dependencies between variable can be explored. The virtual view $SF_v$ will be a function of the video frames $\{F_i\}$ and the correspondence maps $\{fC_i\}$. Furthermore, as described above, the correspondence maps $\{fC_i\}$ can be constructed with 3-D geometry information, which includes the camera parameters ($C_i$) and range map ($R_i$) for each video frame ($F_i$), and the camera parameters corresponding to the target viewpoint 520 ($V_T$). Given these dependencies, Eq. (2) can be rewritten as:

$$p(SF_v | \{F_i\}, \{fC_i\}) p(\{fC_i\} | V_T, \{C_i\}, \{R_i\}) \quad (3)$$

Considering the independence of original frames, Bayes' rule allows us to write this as:

$$\frac{\prod_{i=1}^{N} p(F_i | SF_v, fC_i) \cdot p(SF_v)}{\prod_{i=1}^{N} p(F_i)} \prod_{i=1}^{N} p(fC_i | V_T, C_i, R_i) \quad (4)$$

This formulation consists of four parts:

1) $p(F_i | SF_v, fC_i)$ can be viewed as a "color-consistency prior," and should reflect the fact that corresponding pixels in video frame $F_i$ and virtual view $SF_v$ are more likely to have similar color texture. In a preferred embodiment, this prior is defined as:

$$p(F_i, fC_{i,(x,y)} | SF_{v,(x,y)}, fC_{i,(x,y)}) = \exp(-\beta_i \rho (F_i, fC_{i,(x,y)} - SF_{v,(x,y)})) \quad (5)$$

where $SF_{v,(x,y)}$ is the pixel value at the (x,y) position of the virtual view $SF_v$, $F_i, fC_{i,(x,y)}$ is the pixel value in the video frame $F_i$ corresponding to a pixel position determined by applying the correspondence map $fC_i$ to the (x,y) pixel position, $\beta_i$ is value used to scale the color distance between $F_i$ and $SF_v$. In a preferred embodiment, $\beta_i$ is a function of the camera position distance and is given by $\beta_i = e^{-k\ D}$, where k is a constant and D is the distance between the camera position for $F_i$ and the camera position for the virtual view $SF_v$. The function $\rho(\bullet)$ is a robust kernel, and in this example is the absolute distance $\rho(\bullet) = |\bullet|$. Note that the quantity $F_i, fC_{i,(x,y)}$ corresponds to the warped main image 530 and the warped complementary images 540 shown in FIG. 6. When a particular pixel position corresponds to a hole in one of the warped images, no valid pixel position can be determined by applying the correspondence map $fC_i$ to the (x,y) pixel position. In such cases, these pixels are not included in the calculations.

2) $p(SF_v)$ is a smoothness prior based on the synthesized virtual view $SF_v$, and reflects the fact that the synthesized image should generally be smooth (slowly varying). In a preferred embodiment, it is defined as:

$$p(SF_v) = \prod_{(x,y)} \exp(-\lambda |SF_{v,(x,y)} - AvgN(SF_{v,(x,y)})|) \tag{6}$$

where $AvgN(\bullet)$ means the average value of all neighboring pixels in the 1-nearest neighborhood, and $\lambda$ is a constant.

3) $p(fC_i | V_T, C_i, R_i)$ is a correspondence confidence prior that relates to the confidence for the computed correspondences. The confidence for the computed correspondence will generally be lower when the pixel is in or near a hole in the warped image. The color-consistency prior can provide an indication of whether a pixel location is in a hole because the color in the warped image will have a large difference relative to the color of the virtual view $SF_v$. In a preferred embodiment, we consider a neighborhood around a pixel location of the computed correspondence including the 1-nearest neighbors. The 1-nearest neighbors form a 3×3 square centering at the computed correspondence. We number the pixel locations in this square by j (j=1-9) in order of rows, so that the computed correspondence pixel corresponds to j=5. Theoretically different cases with all possible j should sum up for the objective function, however, we can approximate it by only considering the j which maximize the joint probability with color consistency prior. In one embodiment, the prior can be determined as:

$$p(fC_i | V_T, C_i, R_i) = e^{-\alpha_j}|_{j_{max}} \tag{7}$$

where:

$$e^{-\alpha_j} = \begin{cases} e^{-\theta_1}, & \text{when } j = 5 \\ e^{-\theta_2}, & \text{otherwise.} \end{cases} \tag{8}$$

and $j_{max}$ is the j value that maximizes the quantity $e^{-\alpha_j} p(F_i | SF_v, fC_{i,j})$, $fC_{i,j}$ being the correspondence map for the $j^{th}$ pixel in the neighborhood. It can be assumed that the computed correspondences have higher possibility to be true correspondence than its neighborhoods, so normally we choose $\theta_1 < \theta_2$. In a preferred embodiment, $\theta_1 = 10$ and $\theta_2 = 40$.

4) $p(F_i)$ is the prior on the input video frames 205. We have no particular prior knowledge regarding the input digital video 200, so we can assume that this probability is 1.0 and ignore this term.

Finally, the objective function can be written as:

$$\prod_{i=1}^{N} p(F_i | SF_v, fC_i) \cdot p(fC_i | V_T, C_i, R_i) \cdot p(SF_v) \approx \tag{9}$$

$$\prod_{i=1}^{N} \max_{j} \left[ \exp(-\beta_i \cdot \rho(F_{i,fC_{i,j,(x,y)}} - SF_{v,(x,y)})) \cdot e^{-\alpha_j} \right] \cdot$$

$$\prod_{(x,y)} \exp(-\lambda |SF_{v,(x,y)} - AvgN(SF_{v,(x,y)})|)$$

In the implementation, we minimize the negative log of the objective probability function, and get the following objective function:

$$\sum_{i=1}^{N} \sum_{(x,y)} \beta_i \min_{j} \left[ p(F_{i,fC_{i,j,(x,y)}} - SF_{v,(x,y)}) + \alpha_j \right] + \tag{10}$$

$$\lambda \sum_{(x,y)} |SF_{v,(x,y)} - AvgN(SF_{v,(x,y)})|$$

where the constant $\lambda$ can be used to determine the degree of smooth constrain that is imposed on the synthesized image.

Optimization of this objective function could be directly attempted using global optimization strategies (e.g., simulated annealing). However, attaining a global optimum using such methods is time consuming, which is not desirable for synthesizing many frames for a video. Since the possibilities for each correspondence are only a few, a more efficient optimization strategy can be used. In a preferred embodiment, the objective function is optimized using a method similar to that described by Fitzgibbon et al. in the article entitled "Image-based rendering using image-based priors" (International Journal of Computer Vision, Vol. 63, pp. 141-151, 2005), which is incorporated herein by reference. With this approach, a variant of an iterated conditional modes (ICM) algorithm is used to get an approximate solution. In a preferred embodiment, the ICM algorithm uses an iterative optimization process that involves alternately optimizing the first term (a color-consistency term "V") and the second term (a virtual view term "T") in Eq. (10). For the initial estimation of the first term, $V^0$, the most likely correspondences (j=5) is chosen for each pixel, and the synthesized results are obtained by a weighted average of correspondences from all frames (i=1–N). The initial solution for the second term, $T^0$, can be obtained by using a well-known mean filter. Alternately, a median filter can be used here instead to avoid outliers and blurring sharp boundaries. The input $V_i^{k+1}$ for next iteration can be set as the linear combination of the output of the previous iteration ($V^k$ and $T^k$):

$$V_i^{k+1} = \frac{V^k + \lambda T^k}{1 + \lambda} \tag{10}$$

where k is the iteration number. Finally, after a few iterations (5 to 10 has been found to work well in most cases), the differences of outputs between iterations will converge, and thus synthesize image for the expected new virtual view. In some embodiments, a predefined number of iterations can be performed. In other embodiments a convergence criterion can be defined to determine when the iterative optimization process has converged to an acceptable accuracy.

The optimization of the objective function has the effect of automatically filling the holes in the warped main image 530. The combination of the correspondence confidence prior and the color-consistency prior has the effect of selecting the pixel values from the warped complementary images 540 that do not have holes to be the most likely pixel values to fill the holes in the warped main image 530.

To evaluate the performance of the above-described methods, experiments were conducted using several challenging video sequences. Two video sequences were from publicly available data sets (in particular, the "road" and "lawn" video sequences described by Zhang et al. in the aforementioned article "Consistent depth maps recovery from a video sequence"), another two were captured using a casual video camera ("pavilion" and "stele") and one was a clip from the movie "Pride and Prejudice" (called "pride" for short).

The view synthesis method described with reference to FIG. 6 was compared to two state-of-the-art methods: an interpolation-based method described by Zhang et al. in the aforementioned article entitled "3D-TV content creation: automatic 2-D-to-3-D video conversion" that employs cubic-interpolation to fill the holes generated by parallax, and a blending method described by Zitnick et al. in the aforementioned article "Stereo for image-based rendering using image over-segmentation" that involves blending virtual views generated by the two closest camera frames to synthesize a final virtual view.

Since ground truth for virtual views is impossible to obtain for an arbitrary viewpoint, an existing frame from the original video sequence can be selected to use as a reference. A new virtual view with the same viewpoint can then be synthesized from a different main image and compared to the reference to evaluate the algorithm performance. For each video, 10 reference frames were randomly selected to be synthesized by all three methods. The results were quantitatively evaluated by determining peak signal-to-noise ratio (PSNR) scores representing the difference between the synthesized frame and the ground truth reference frame.

Figure 7:
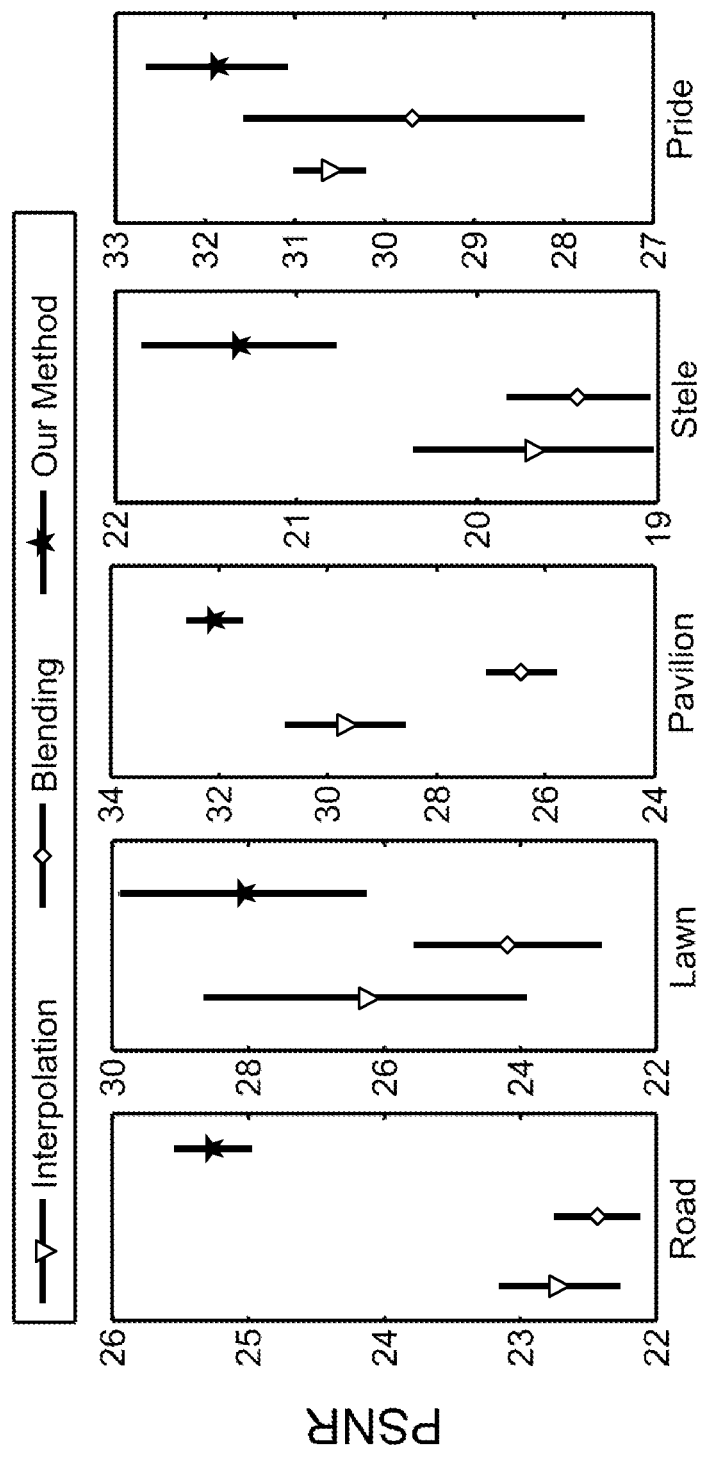
FIG. 7 shows a graph comparing the performance of the present invention to two prior art methods.

FIG. 7 is a graph comparing the calculated PSNR scores for the method of FIG. 6 to those for the aforementioned prior art methods. Results are shown for each of the 5 sample videos that were described above. The data symbol shown on each line shows the average PSNR, and the vertical extent of the lines shows the range of the PSNR values across the 10 frames that were tested. It can be seen that the method of the present invention achieves substantially higher PSNR scores with comparable variance. This implies that the method of the present invention can robustly synthesize virtual views with better quality.

The method for forming an output image 550 with a target viewpoint 520 described with reference to FIG. 6 can be adapted to a variety of different applications besides the illustrated example of forming of a frame for a stabilized video. One such example relates to the Kinect game console available for the Xbox 360 gaming system from Microsoft Corporation of Redmond, Wash. Users are able to interact with the gaming system without any hardware user interface controls through the use of a digital imaging system that captures real time images of the users. The users interact with the system using gestures and movements which are sensed by the digital imaging system and interpreted to control the gaming system. The digital imaging system includes an RGB digital camera for capturing a stream of digital images and a range camera (i.e., a "depth sensor") that captures a corresponding stream of range images that are used to supply depth information for the digital images. The range camera consists of an infrared laser projector combined with a monochrome digital camera. The range camera determines the range images by projecting an infrared structured pattern onto the scene and determining the range as a function of position using parallax relationships given a known geometrical relationship between the projector and the digital camera.

Figure 8:
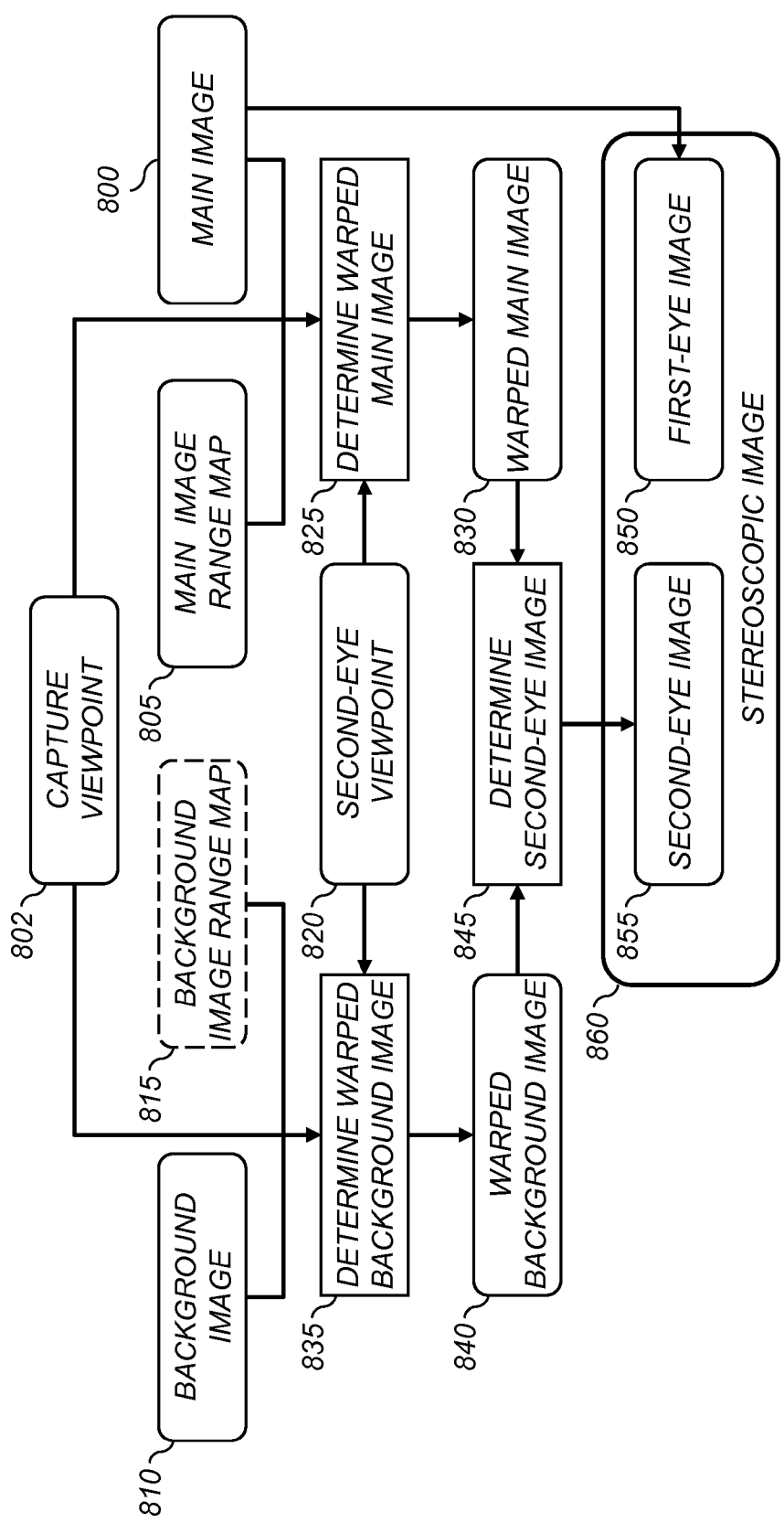
FIG. 8 is a flowchart of a method for forming a stereoscopic image from a monoscopic main image and a corresponding range map.

In some scenarios, it would be desirable to be able to form a stereoscopic image of the users of the gaming system using the image data captured with the digital imaging system (e.g., at a decisive moment of victory in a game). FIG. 8 shows a flowchart illustrating how the method of the present invention can be adapted to form a stereoscopic image 860 from a main image 800 and a corresponding main image range map 805 (e.g., captured using the Kinect range camera). The main image 800 is a conventional 2-D image that is captured using a conventional digital camera (e.g., the Kinect RGB digital camera).

The main image range map 805 can be provided using any range sensing means known in the art. In one embodiment, the main image range map 805 is captured using the Kinect range camera. In other embodiments, the main image range map 805 can be provided using the method described in commonly-assigned, co-pending U.S. patent application Ser. No. 13/004,207 to Kane et al., entitled "Forming 3D models using periodic illumination patterns," which is incorporated herein by reference. In other embodiments, the main image range map 805 can be provided by capturing two 2D images of the scene from different viewpoints and then determining a range map based on identifying corresponding points in the two image, similar to the process described with reference to FIG. 2.

In addition to the main image 800 and the main image range map 805, a background image 810 is also provided as an input to the method. The background image 810 is an image of the image capture environment that was captured during a calibration process without any users in the field-of-view of the digital imaging system. Optionally, a background image range map 815 corresponding to the background image 810 can also be provided. In a preferred embodiment, the main image 800 and the background image 810 are both captured from a common capture viewpoint 802, although this is not a requirement.

The main image range map 805 and the optional background image range map 815 can be captured using any type of range camera known in the art. In some embodiments, the range maps are captured using a range camera that includes an infrared laser projector and a monochrome digital camera, such as that in the Kinect game console. In other embodiments, the range camera includes two cameras that capture images of the scene from two different viewpoints and determines the range values by determining disparity values for corresponding points in the two images (for example, using the method described with reference to FIGS. 2 and 3).

In a preferred embodiment the main image 800 is used as a first-eye image 850 for the stereoscopic image 860, and a second-eye image 855 is formed in accordance with the present invention using a specified second-eye viewpoint 820. In other embodiments, the first-eye image 850 can also be determined in accordance with the present invention by specifying a first-eye viewpoint that is different than the capture viewpoint and using an analogous method to adjust the viewpoint of the main image 800.

A determine warped main image step 825 is used to determine a warped main image 830 responsive to the main image 800, the main image range map 805, the capture viewpoint 802 and the second-eye viewpoint 820. (This step is analogous to the determine warped main image step 525 of FIG. 6.)

A determine warped background image step 835 is used to determine a warped background image 840 responsive to the background image 810, the capture viewpoint 802 and the second-eye viewpoint 820. For cases where a background image range map 815 has been provided, the warping process of the determine warped background image step 835 is analogous to the determine warped complementary images step 535 of FIG. 6.

For cases where the background image range map 815 has not been provided, a number of different approaches can be used in accordance with the present invention. In some embodiments, a background image range map 815 corresponding to the background image 810 can be synthesized responsive to the background image 810, the main image 800 and the main image range map 805. In this case, range values from background image regions in the main image range map 805 can be used to define corresponding portions of the background image range map. The remaining holes (corresponding to the foreground objects in the main image 800) can be filled in using interpolation. In some cases, a segmentation algorithm can be used to segment the background image 810 into different objects so that consistent range values can be determined within the segments.

In some embodiments, the determine warped background image step 835 cab determine the warped background image 840 without the use of a background image range map 815. In one such embodiment, the determination of the warped background image 840 is performed by warping the background image 810 so that background image regions in the warped main image 830 are aligned with corresponding background image regions of the warped background image 840. For example, the background image 810 can be warped using a geometric transform that shifts, rotates and stretches the background image according to a set of parameters. The parameters can be iteratively adjusted until the background image regions are optimally aligned. Particular attention can be paid to aligning the background image regions near any holes in the warped main image 830 (e.g., by applying a larger weight during the optimization process), because these are the regions of the warped background image 840 that will be needed to fill the holes in the warped main image 830.

The warped main image 830 will generally have holes in it corresponding to scene information that was occluded by foreground objects (i.e., the users) in the main image 800. The occluded scene information will generally be present in the warped background image 840, which can be used to supply the information needed to fill the holes. A determine second-eye image step 845 is used to determine the second-eye image 855 by combining the warped main image 830 and the warped background image 840.

In some embodiments, the determine second-eye image step 845 identifies any holes in the warped main image 830 and fills them using pixel values from the corresponding pixel locations in the warped background image. In other embodiments, the Bayesian-based view synthesis approach described above with reference to FIG. 6 can be used to combine the warped main image 830 and the warped background image 840.

The stereoscopic image 860 can be used for a variety of purposes. For example, the stereoscopic image 860 can be displayed on a stereoscopic display device. Alternately, a stereoscopic anaglyph image can be formed from the stereoscopic image 860 and printed on a digital color printer. The printed stereoscopic anaglyph image can then be viewed by an observer wearing anaglyph glass to view the image, thereby providing a 3-D perception. Methods for forming anaglyph images are well-known in the art. Anaglyph glasses have two different colored filters over the left and right eyes of the viewer (e.g., a red filter over the left eye and a blue filter over the right eye). The stereoscopic anaglyph image is created so that the image content intended for the left eye is transmitted through the filter over the user's left eye and absorbed by the filter over the user's right eye. Likewise, the image content intended for the right eye is transmitted through the filter over the user's right eye and absorbed by the filter over the user's left eye. It will be obvious to one skilled in the art that the stereoscopic image 860 can similarly be printed or displayed using any 3-D image formation system known in the art.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

| | PARTS LIST |
|---|---|
| 110 | data processing system |
| 120 | peripheral system |
| 130 | user interface system |
| 140 | data storage system |
| 200 | digital video |
| 205 | video frame |
| 210 | determine disparity maps step |
| 215 | disparity map series |
| 220 | disparity map |
| 225 | refine disparity maps step |
| 230 | refined disparity map series |
| 235 | refined disparity map |
| 240 | determine range maps step |
| 245 | range map series |
| 250 | range map |
| 305 | select video frame step |
| 310 | particular video frame |
| 315 | determine extrinsic parameters step |
| 320 | extrinsic parameters |
| 325 | determine intrinsic parameters step |
| 330 | intrinsic parameters |
| 335 | define candidate frames step |
| 340 | candidate video frames |
| 345 | determine similarity scores step |
| 350 | image similarity scores |
| 355 | select subset step |
| 360 | video frames subset |
| 365 | determine position difference scores step |
| 370 | position difference scores |
| 375 | select video frame step |
| 380 | selected video frame |
| 385 | determine disparity map step |
| 405 | determine input camera positions step |
| 410 | input camera positions |
| 415 | determine input camera path step |
| 420 | input camera path |
| 425 | determine smoothed camera path step |
| 430 | smoothed camera path |
| 432 | determine smoothed camera |

-continued

PARTS LIST

| | |
|---|---|
| | positions step |
| 434 | smoothed camera positions |
| 435 | determine stabilized video step |
| 440 | stabilized video |
| 445 | stabilized video frames |
| 450 | determine second-eye smoothed camera positions step |
| 455 | second-eye smoothed camera positions |
| 460 | determine second-eye stabilized video step |
| 465 | second-eye stabilized video |
| 470 | second-eye stabilized video frames |
| 475 | stabilized stereoscopic video |
| 480 | input camera path graph |
| 485 | smoothed camera path graph |
| 500 | main image |
| 505 | set of complementary images |
| 510 | complementary image |
| 515 | viewpoint |
| 520 | target viewpoint |
| 525 | determine warped main image step |
| 530 | warped main image |
| 535 | determine warped complementary images step |
| 540 | warped complementary images |
| 545 | determine output image step |
| 550 | output image |
| 800 | main image |
| 802 | capture viewpoint |
| 805 | main image range map |
| 810 | background image |
| 815 | background image range map |
| 820 | second-eye viewpoint |
| 825 | determine warped main image step |
| 830 | warped main image |
| 835 | determine warped background image step |
| 840 | warped background image |
| 845 | determine second-eye image step |
| 850 | first-eye image |
| 855 | second-eye image |
| 860 | stereoscopic image |

The invention claimed is:

1. A method for forming a stereoscopic image, the method implemented at least in part by a data processing system and comprising:

receiving a main image of a scene at a first time, including one or more foreground objects captured from a main image viewpoint together with a corresponding main image range map, wherein the main image includes a two-dimensional array of image pixels;

receiving a background image of the scene at a second time, without the one or more foreground objects captured from a background image viewpoint;

specifying a first-eye viewpoint and a second-eye viewpoint;

determining a first-eye image corresponding to the first-eye viewpoint and a second-eye image corresponding to the second-eye viewpoint, wherein at least one of the first-eye image and the second-eye image is determined by:

synthesizing a warped main image by warping the main image to the corresponding first-eye viewpoint or second-eye viewpoint responsive to the main image range map and the main image viewpoint, wherein the warped main image includes one or more holes corresponding to scene content that was occluded in the main image;

synthesizing a warped background image by warping the background image to the corresponding first-eye viewpoint or second-eye viewpoint responsive to the background image viewpoint; and determining pixel values to fill the one or more holes in the warped main image using pixel values at corresponding pixel locations in the warped background image;

forming a stereoscopic image including the first-eye image and the second-eye image; and storing the stereoscopic image is a processor-accessible memory.

2. The method of claim 1 further including receiving a background image range map corresponding to the background image, and wherein the synthesis of the warped background image is also responsive to the background image range map.

3. The method of claim 1 further including synthesizing a background image range map corresponding to the background image responsive to the background image, the main image and the main image range map, and wherein the synthesis of the warped background image is also responsive to the background image range map.

4. The method of claim 1 wherein the synthesis of the warped background image is performed by warping the background image so that background image regions in the warped main image are aligned with corresponding background image regions of the warped background image.

5. The method of claim 1 wherein both the left-eye image and the right-eye image are synthesized by warping the main image.

6. The method of claim 1 wherein the main image viewpoint is the same as either the left-eye viewpoint or the right-eye viewpoint.

7. The method of claim 3 wherein the main image is used for the left-eye image if the main image viewpoint is the same as the left-eye viewpoint, or the main image is used for the right-eye image if the main image viewpoint is the same as the right-eye viewpoint.

8. The method of claim 1 wherein the background image viewpoint is the same as the main image viewpoint.

9. The method of claim 1 wherein the background image and the background image range map are captured during a system calibration process.

10. The method of claim 1 wherein the main image and the background image are captured using a digital camera that is a component of a gaming system.

11. The method of claim 1 wherein the main image range map and the background image range map are captured using a range camera that is a component of a gaming system.

12. The method of claim 1 wherein the main image range map and the background image range map are captured using a range camera that includes an infrared laser projector combined with a monochrome digital camera.

13. The method of claim 1 wherein the main image range map and the background image range map are determined by capturing digital images from two different viewpoints, determining disparity values for corresponding points in the two images, and determining range values for the range maps responsive to the disparity values.

14. The method of claim 1 further including displaying the stereoscopic image on a stereoscopic display device.

15. The method of claim 1 further including forming a stereoscopic anaglyph image adapted for viewing using anaglyph glasses having a left-eye filter of a first color and a right-eye filter of a second color.

16. The method of claim 12 further including printing the stereoscopic anaglyph image.

17. A non-transitory computer readable storage medium, readable by one or more computers and comprising instructions stored thereon to cause the one or more computers to:
- receive a main image of a scene at a first time, including one or more foreground objects captured from a main image viewpoint together with a corresponding main image range map, wherein the main image includes a two-dimensional array of image pixels;
- receive a background image of the scene at a second time, without the one or more foreground objects captured from a background image viewpoint;
- specifying a first-eye viewpoint and a second-eye viewpoint;
- determine a first-eye image corresponding to the first-eye viewpoint and a second-eye image corresponding to the second-eye viewpoint, wherein at least one of the first-eye image and the second-eye image is determined by causing the one or more computers to:
  - synthesize a warped main image by warping the main image to the corresponding first-eye viewpoint or second-eye viewpoint responsive to the main image range map and the main image viewpoint, wherein the warped main image includes one or more holes corresponding to scene content that was occluded in the main image;
  - synthesize a warped background image by warping the background image to the corresponding first-eye viewpoint or second-eye viewpoint responsive to the background image viewpoint; and
  - determine pixel values to fill the one or more holes in the warped main image using pixel values at corresponding pixel locations in the warped background image;
- form a stereoscopic image including the first-eye image and the second-eye image; and
- store the stereoscopic image is a processor-accessible memory.

18. The non-transitory computer readable storage medium of claim 17, wherein the stored instructions further comprise instructions to cause the one or more computers to receive a background image range map corresponding to the background image, and wherein the synthesis of the warped background image is also responsive to the background image range map.

19. The non-transitory computer readable storage medium of claim 17, wherein the stored instructions further comprise instructions to cause the one or more computers to synthesize a background image range map corresponding to the background image responsive to: the background image, the main image, and the main image range map, and wherein the synthesis of the warped background image is also responsive to the background image range map.

20. The non-transitory computer readable storage medium of claim 17, wherein the synthesis of the warped background image is performed by causing the one or more computers to warp the background image so that background image regions in the warped main image are aligned with corresponding background image regions of the warped background image.

* * * * *

UNITED STATES PATENT AND TRADEMARK OFFICE
CERTIFICATE OF CORRECTION

PATENT NO. : 8,611,642 B2  Page 1 of 1
APPLICATION NO. : 13/298334
DATED : December 17, 2013
INVENTOR(S) : Sen Wang It is certified that error appears in the above-identified patent and that said Letters Patent is hereby corrected as shown below:

On the Title Page, item (54) and in the Specification, Column 1, line 1, in the Title, change the word "Steroscopic" to --Stereoscopic--.

On the Title Page, item (57) in the Abstract, line 3, add the word --with-- after the word "together".

In the Claims:

Column 24, Claim 1, line 36, replace "is" with --in--.

Column 26, Claim 17, line 35, replace "is" with --in--.

Signed and Sealed this
Twenty-fifth Day of February, 2014

Michelle K. Lee
*Deputy Director of the United States Patent and Trademark Office*